United States Patent
Tinkler et al.

(10) Patent No.: US 8,282,857 B2
(45) Date of Patent: Oct. 9, 2012

(54) MODIFICATION OF COPPER/IRON SELECTIVITY IN COPPER SOLVENT EXTRACTION SYSTEMS

(75) Inventors: Owen Stewart Tinkler, Tempe, AZ (US); Keith Alan Cramer, Whippany, NJ (US); Peter Eric Tetlow, Phoenix, AZ (US); John Campbell, Rochdale (GB); Charles J. Maes, Phoenix, AZ (US)

(73) Assignee: Cytec Technology Corp., Wilmington, DE (US)

( * ) Notice: Subject to any disclaimer, the term of this patent is extended or adjusted under 35 U.S.C. 154(b) by 651 days.

(21) Appl. No.: 11/392,083

(22) Filed: Mar. 29, 2006

(65) Prior Publication Data
US 2006/0222580 A1 Oct. 5, 2006

(51) Int. Cl.
C22B 15/00 (2006.01)
C22B 3/30 (2006.01)
C09K 3/00 (2006.01)

(52) U.S. Cl. ............. 252/184; 423/1; 423/24; 423/138; 423/139; 423/23

(58) Field of Classification Search ............... 423/1, 23, 423/24, 138, 139; 252/184
See application file for complete search history.

(56) References Cited

U.S. PATENT DOCUMENTS

| | | | | | |
|---|---|---|---|---|---|
| 4,231,888 | A | * | 11/1980 | Dalton | 252/184 |
| 4,507,268 | A | * | 3/1985 | Kordosky et al. | 423/24 |
| 4,600,435 | A | * | 7/1986 | Wiegers et al. | 423/139 |
| 5,470,552 | A | | 11/1995 | Kordosky et al. | 423/139 |
| 5,578,217 | A | * | 11/1996 | Unger et al. | 210/670 |
| 6,054,105 | A | * | 4/2000 | Jones | 423/139 |
| 6,733,688 | B1 | * | 5/2004 | Sugarman et al. | 252/184 |
| 7,309,474 | B2 | * | 12/2007 | Soderstrom | 423/24 |
| 2002/0157572 | A1 | * | 10/2002 | Sudderth et al. | 106/311 |
| 2004/0126291 | A1 | * | 7/2004 | Sudderth et al. | 423/24 |
| 2004/0208807 | A1 | * | 10/2004 | Soderstrom | 423/24 |
| 2005/0023151 | A1 | | 2/2005 | Sandoval et al. | 205/574 |
| 2005/0087722 | A1 | * | 4/2005 | Sudderth et al. | 252/184 |
| 2006/0192175 | A1 | * | 8/2006 | Sudderth et al. | 252/184 |

FOREIGN PATENT DOCUMENTS

| | | | |
|---|---|---|---|
| RU | 2186135 | * | 1/2001 |
| WO | WO 2004/028964 A1 | | 4/2004 |
| WO | WO2004/094676 | * | 11/2004 |
| WO | WO 2004/094676 A1 | | 11/2004 |
| WO | WO 2006/032097 A1 | | 3/2006 |

OTHER PUBLICATIONS

Patent Abstracts of Japan vol. 18, No. 668 (C-1289; Dec. 16, 1994; and JP 06 264156 A (Sekiyu Sangyo Kasseika Center), Sep. 20, 1994.
Patent Abstracts of Japan vol. 1996, No. 8; Aug. 30, 1996; and JP 08 092665 A (Catalysts & Chem Ind Co LTD) Apr. 9, 1996.
Patent Abstracts of Japan vol. 018, No. 668 (C-1289; Dec. 16, 1994; and JP 06 264156 A (Sekiyu Sangyo Kasseika Center), Sep. 20, 1994.
Patent Abstracts of Japan vol. 1996, No. 08; Aug. 30, 1996; and JP 08 092665 A (Catalysts Chem Ind Co LTD) Apr. 9, 1996.
Patent Abstracts of Japan vol. 2003, No. 12; Dec. 5, 2003; and JP 2004 307983 A (National Institute of Advanced Industrial & Technology; Nippon Kanizen), Nov. 4, 2004.

* cited by examiner

*Primary Examiner* — Stuart Hendrickson
*Assistant Examiner* — Richard M Rump
(74) *Attorney, Agent, or Firm* — Charles E. Bell; Elizabeth A. Galletta

(57) ABSTRACT

A solvent extraction composition comprising one or more orthohydroxyarylaldoximes and/or one or more orthohydroxyarylketoximes, and one or more selectivity modifiers consisting of phosphinic and/or phosphonic acids, and salts and esters therefore and optionally one or more equilibrium modifiers is provided.

9 Claims, No Drawings

MODIFICATION OF COPPER/IRON SELECTIVITY IN COPPER SOLVENT EXTRACTION SYSTEMS

The present invention concerns a solvent extraction composition, a solvent extraction process and especially a process for the extraction of metals, particularly copper and iron, from aqueous solutions, especially solutions obtained by leaching ores.

It is known to extract metals, especially copper and to a much lesser degree iron, from aqueous solutions containing the metals in the form of, for example, salts, by contacting the aqueous solution with a solution of a solvent extractant in a water immiscible organic solvent and then separating the solvent phase loaded with the metals, i.e. containing at least a part of the metals in the form of a complex The metals can then be recovered by stripping with a solution of lower pH (the electrolyte) followed for example, by electrowinning. Most commonly, the aqueous metal-containing solutions for extraction are the result of the acid leaching of ores.

Solvent extractants which have found favour in recent years particularly for the recovery of copper from aqueous solutions include oxime reagents, especially o-hydroxyarylaldoximes and o-hydroxyarylketoximes. The oxime reagents exhibit a high degree of selectivity of copper over iron which is commonly expressed as the transfer ratio. The transfer ratio is the ratio of the loaded organic copper concentration minus the stripped organic copper concentration divided by the loaded organic iron concentration minus the stripped organic iron concentration. Although a high transfer ratio is usually desired, the presence of some iron in the electroyte can also have benefits as described in for example US patent application 2005/0023151. In some cases iron is desired as a counter ion to maintain a certain EMF value in the electrolyte. The selectivity of copper over iron is a function of the metal extractant, the metal and acid concentrations in the leach solution and electrolyte, and the operating conditions in the solvent extraction plant. In many instances using the present copper solvent extractants the selectivity of copper over iron is such that insufficient iron is transferred to the electrolyte via the organic phase to maintain the concentration range required. In such cases iron sulphate is added to the electrolyte to achieve the desired concentration.

Using the solvent extraction process it is common for other impurities to be transferred to the electrolyte by a physical means. Impurities transferred to the strip solution will eventually build up in the circuit and have a negative impact on the electrowinning step. For that reason, operations often bleed a portion of the electrolyte to control the build up of impurities. In those cases, the electrolyte must be replaced with fresh water, acid, and iron (usually as ferrous sulphate). In some cases the amount of iron which must be added to make up for that which is lost in the bleed can be excessive. The addition of iron can negatively effect the economics of an operation. For these reasons it would be highly desirable to have a solvent extractant formulation which would allow an operation to achieve a desired transfer ratio—without losing the well know benefits of the hydroxyl oxime formulations commonly used today.

Although there are many chelating reagents which have a higher affinity for iron than the hydroxy oximes, It has surprisingly been found that the addition of small quantities of a select few iron chelating reagents (hereafter referred to as selectivity modifiers) to oxime reagents has a profound effect on the copper over iron selectivity characteristics of the resulting extractant composition. This effect on the resulting copper:iron transfer ration is significantly greater than the effect of the sum of the two products when used independently.

According to a first aspect of the present invention, there is provided a solvent extraction composition comprising one or more orthohydroxyarylaldoximes and/or one or more orthohydroxyarylketoximes, one or more selectivity modifiers consisting of phosphinic and/or phosphonic acids, salts or esters therefore, and optionally one or more equilibrium modifiers. The selectivity modifiers are preferably present in a molar ratio of the o-hydoxy oxime:selectivity modifier from about 0.001 to 0.05. The compositions preferably also comprise a water immiscible organic solvent.

Compositions according to the present invention may facilitate increased iron transfer in solvent extraction circuits. Higher iron transfer can be translated into a decrease in the use of iron sulphate addition to the electrolyte to maintain a target electrolyte iron concentration. Compositions according to the present invention may find particular use with processes which require electrolyte iron concentrations significantly above the conventional range.

The orthohydroxyarylketoxime compounds employed in the present invention are substantially water insoluble and preferably have the formula:

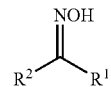

Formula (1)
wherein
$R^1$ is an optionally substituted hydrocarbyl group
$R^2$ is an optionally substituted ortho-hydroxyaryl group, and salts thereof.

The orthohydroxyarylaldoxime compounds employed in the present invention are substantially water insoluble and preferably have the formula:

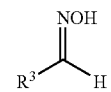

Formula (2)
wherein
$R^3$ is an optionally substituted ortho-hydroxyaryl group, and salts thereof.

Whilst the invention is described herein with reference to compounds of Formula (1) and (2), it is understood that it relates to said compound in any possible tautomeric forms, and also the complexes formed between orthohydroxyarylaldoximes or orthohydroxyarylketoximes and metals, particularly copper.

Optionally substituted hydrocarbyl groups which may be represented by $R^1$ preferably comprise optionally substituted alkyl and aryl groups including combinations of these, such as optionally substituted aralkyl and alkaryl groups.

Examples of optionally substituted alkyl groups which may be represented by $R^1$ include groups in which the alkyl moieties can contain from 1 to 20, especially from 1 to 4, carbon atoms. A preferred orthohydroxyarylketoxime is one in which $R^1$ is alkyl, preferably containing up to 20, and especially up to 10, and more preferably up to 3 saturated aliphatic carbon atoms, and most preferably $R^1$ is a methyl group.

Examples of optionally substituted aryl groups which may be represented by $R^1$ include optionally substituted phenyl groups. When $R^1$ is an aryl group, it is preferably an unsubstituted phenyl group.

The orthohydroxyarylaldoximes and orthohydroxyarylketoximes are often present in a total amount of up to 70% by weight of the composition, commonly no more than 60%, and usually no more than 50% w/w. Often, the total amount of orthohydroxyarylaldoxime and orthohydroxyarylketoxime in use comprises at least 1% by weight, commonly at least 2.5% by weight and usually at least 5% by weight of composition, and preferably comprises from 7.5 to 20%, such as about 10%, by weight of the composition.

The criteria for selectivity modifier selection is stringent as the chemistry used must have no detrimental effect on the copper solvent extraction process. More specifically, the selectivity modifier must not interfere with copper transfer; it must be selective over other metals likely to be present in significant concentration in the leach solution; it must not have a detrimental affect on kinetic performance; it must not have a detrimental affect on stability of the extractant, and it must not be detrimental to the physical performance of the organic phase. The selectivity modifiers employed in the present invention are substantially water insoluble phosphinic and phosphonic acids, or salts or esters therefore. Preferred selectivety modifiers are selected from the group of phosphinic acids, or salts or esters thereof of the formula $R_4R_5P(O)OR_6$ where $R_4$ is H, C1-C20 alkyl, aryl or arylalkyl group $R_5$ is H, C1-C20 alkyl, aryl or arylalkyl group, and $R_6$ is H, a metal cation or $NR_74$ where $R_7$ is H, a C1-C20 alkyl, aryl or arylalkyl group, or phosphonic acids or salts or esters thereof of the formula $R_8R_9OP(O)OR_{10}$ where $R_8$ is H, C1-C20 alkyl, aryl or arylalkyl group, $R_9$ is H, C1-C20 alkyl, aryl or arylalkyl group, and $R_{10}$ is H, a metal cation, or $NR_74$ where $R_7$ is H, C1-C20 alkyl, aryl or arylalkyl group. Examples of suitable phosphinic acids include bis(2,4,4-trimethyl)phosphinic acid and bis(2-ethylhexyl)phosphinic acid or their salts. Examples of suitable phosphonic acids include bis(2-ethylhexyl)phosphonic acid and phenylphosphonic acid or their salts. Examples of suitable phosphonic acids esters include 2-ethylhexylphosphonic acid, mono-2-ethylhexyl ester. The selectivity modifier preferably is present in a molar ratio of the o-hydoxyoxime:selectivity modifier from about 0.001 to 0.05.

Equilibrium modifiers employed in the present invention are substantially water insoluble. Suitable equilibrium modifiers can be alkylphenols, alcohols, esters, ethers and polyethers, carbonates, ketones, nitrites, amides, carbamates, sulphoxides, and salts of amines and quaternary ammonium compounds.

Organic solvents which may be present in the composition include any mobile organic solvent, or mixture of solvents, which is immiscible with water and is inert under the extraction conditions to the other materials present. Preferably the organic solvent has a low aromatic hydrocarbon content.

Preferred organic solvents are hydrocarbon solvents which include aliphatic, alicyclic and aromatic hydrocarbons and mixtures thereof as well as chlorinated hydrocarbons such as trichloroethylene, perchloroethylene, trichloroethane and chloroform.

Highly preferred organic solvents having a low aromatics content include solvents and solvent mixtures where the amount of aromatic hydrocarbons present in the organic solvent is less than 30%, usually around 23% or less, often less than 5%, and frequently less than 1%.

Examples of suitable hydrocarbon solvents include ESCAID 110, ESCAID 115, ESCAID 120, ESCAID 200, and ESCAID 300 commercially available from Exxon (ESCAID is a trade mark), SHELLSOL D70 and D80 300 commercially available from Shell (SHELLSOL is a trade mark), and CONOCO 170 commercially available from Conoco (CONOCO is a trade mark). Suitable solvents are hydrocarbon solvents include high flash point solvents and solvents with a high aromatic content such as SOLVESSO 150 commercially available from Exxon (SOLVESSO is a trade mark).

More preferred are solvents with a low aromatic content. Certain suitable solvents with a low aromatic content, have aromatic contents of <1% w/w, for example, hydrocarbon solvents such as ESCAID 110 commercially available from Exxon (ESCAID is a trade mark), and ORFOM SX 10 and ORFOM SX11 commercially available from Phillips Petroleum (ORFOM is a trade mark). Especially preferred, however on grounds of low toxicity and wide availability, are hydrocarbon solvents of relatively low aromatic content such as kerosene, for example ESCAID 100 which is a petroleum distillate with a total aromatic content of 23% commercially available from Exxon (ESCAID is a trade mark), or ORFOM SX7, commercially available from Phillips Petroleum (ORFOM is a trade mark).

In many embodiments, the composition comprises at least 30%, often at least 45% by weight, preferably from 50 to 95% w/w of water-immiscible hydrocarbon solvent. Advantageously, it may be preferred to make and supply the composition in the form of a concentrate. The concentrate may then be diluted by the addition of organic solvents as described herein above to produce compositions in the ranges as described herein above. Where the concentrate contains a solvent, it is preferred that the same solvent is used to dilute the concentrate to the "in use" concentration range. In many embodiments, the concentrate composition comprises up to 30%, often up to 20% by weight, preferably up to 10% w/w of water-immiscible hydrocarbon solvent. Often the concentrate composition comprises greater than 5% w/w of water-immiscible hydrocarbon solvent. In certain high strength concentrates it may be necessary to employ a higher than normal aromatic hydrocarbon content. In such cases where a high aromatic hydrocarbon containing solvent is used in the concentrate, solvent of very low aromatic hydrocarbon content may be used to dilute the concentrate to the "in use" concentration range.

Examples of suitable solvent extraction compositions are those which comprise one of the following:

1) Blends of 5-($C_8$ to $C_{14}$ alkyl)-2-hydroxybenzaldoxime and 5-($C_8$ to $C_{14}$ alkyl)-2-hydroxyacetophenone oxime in a weight ratio of from about 90:10 to about 50:50 aldoxime to ketoxime, and/or optionally one or more modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, butyl adipate, pentyl adipate, hexyl adipate, isobutyl heptyl ketone, nonanone, diundecyl ketone, 5,8-diethyldodecane-6,7-dione, tridecanol, tetraethyleglycol di-2-ethylhexanoate, and nonyl phenol, and a selectivity modifier selected from bis(2,4,4-trimethylpently)phosphinic acid or 2-ethylhexylphosphonic acid, mono-2-ethylhexyl ester, present as a molar ratio of the o-hydoxyoxime:selectivity modifier from about 0.001 to 0.05.

2) Blends of 5-($C_8$ to $C_{14}$ alkyl)-2-hydroxybenzaldoxime or 5-($C_8$ to $C_{14}$ alkyl)-2-hydroxyacetophenone oxime, optionally one or more modifiers selected from 2,2,4-trimethyl-1,3-pentanediol mono-isobutyrate, 2,2,4-trimethyl-1, 3-pentanediol mono-benzoate, 2,2,4-trimethyl-1,3-pentanediol di-isobutyrate, 2,2,4-trimethyl-1,3-pentanediol di-benzoate, butyl adipate, pentyl adipate, hexyl adipate, isobutyl heptyl ketone, nonanone, diundecyl ketone, 5,8-diethyldodecane-6,7-dione, tridecanol, and nonyl phenol, and a selectivity modifier selected from bis(2,4,4-trimethylpently) phosphinic acid or 2-ethylhexylphosphonic acid, mono-2-ethylhexyl ester, present as a molar ratio of the o-hydoxyoxime:selectivity modifier from about 0.001 to 0.05.

According to a second aspect of the present invention, there is provided a process for the extraction of a metal from solution in which an acidic solution containing a dissolved metal is contacted with a solvent extraction composition, whereby at least a fraction of the metal is extracted into the organic solution, characterised in that the solvent extraction composition comprises a water immiscible organic solvent, one or more orthohydroxyarylaldoximes and one or more orthohydroxyarylketoximes, and a selectivity modifier present in a molar ratio of the o-hydoxyoxime from about 0.001 to 0.05.

Metals that may be extracted in the process according to the second aspect of the present invention include copper, iron, cobalt, nickel, manganese and zinc, most preferably copper.

The orthohydroxyarylaldoximes, orthohydroxyarylketoximes, the equilibrium modifiers, the selectivity modifiers and the water immiscible organic solvent are as herein described above.

The aqueous acidic solution from which metals are extracted by the process of the second aspect of the present invention often has a pH in the range of from −1 to 7, preferably from 0 to 5, and most preferably from 0.25 to 3.5. The solution can be derived from the leaching of ores or may be obtained from other sources, for example metal containing waste streams The concentration of metal, particularly copper, in the aqueous acidic solution will vary widely depending for example on the source of the solution. Where the solution is derived from the leaching of ores, the metal concentration is often up to 75 g/l and most often from 1 to 40 g/l.

The process of the second aspect of the present invention can be carried out by contacting the solvent extractant composition with the aqueous acidic solution. Ambient or elevated temperatures, such as up to 75° C. can be employed if desired. Often a temperature in the range of from 5 to 60° C., and preferably from 15 to 40° C., is employed. The aqueous solution and the solvent extractant are usually agitated together to maximise the interfacial areas between the two solutions. The volume ratio of solvent extractant to aqueous solution are commonly in the range of from 20:1 to 1:20, and preferably in the range of from 5:1 to 1:5. In many embodiments, to reduce plant size and to maximise the use of solvent extractant, organic to aqueous volume ratios close to 1:1 are maintained by recycle of one of the streams.

After contact with the aqueous acidic solution, the metal can be recovered from the solvent extractant by contact with an aqueous acidic strip solution.

The aqueous strip solution employed in the process according to the second aspect of the present invention is usually acidic, commonly having a pH of 2 or less, and preferably a pH of 1 or less, for example, a pH in the range of from −1 to 0.5. The strip solution commonly comprises a mineral acid, particularly sulphuric acid, nitric acid or hydrochloric acid. In many embodiments, acid concentrations, particularly for sulphuric acid, in the range of from 130 to 200 g/l and preferably from 150 to 180 g/l are employed. When the extracted metal is copper, preferred strip solutions comprise stripped or spent electrolyte from a copper electro-winning cell, typically comprising up to 80 g/l copper, often greater than 20 g/l copper and preferably from 30 to 70 g/l copper, and up to 220 g/l sulphuric acid, often greater than 120 g/l sulphuric acid, and preferably from 150 to 180 g/l sulphuric acid.

The volume ratio of organic solution to aqueous strip solution in the process of the second aspect of the present invention is commonly selected to be such so as to achieve transfer, per liter of strip solution, of up to 50 g/l of metal, especially copper into the strip solution from the organic solution. In many industrial copper electrowinning processes transfer is often from 10 g/l to 35 g/l, and preferably from 15 to 20 g/l of copper per liter of strip solution is transferred from the organic solution. Volume ratios of organic solution to aqueous solution of from 1:2 to 15:1 and preferably from 1:1 to 10:1, especially less than 6:1 are commonly employed.

Both the separation and stripping process can be carried out by a conventional batch extraction technique or column contactors or by a continuous mixer settler technique. The latter technique is generally preferred as it recycles the stripped organic phase in a continuous manner, thus allowing the one volume of organic reagent to be repeatedly used for metal recovery.

A preferred embodiment of the second aspect of the present invention comprises a process for the extraction of a metal from aqueous acidic solution in which:

in step 1, the solvent extraction composition comprising a water immiscible organic solvent, one or more orthohydroxyarylaldoximes and/or one or more orthohydroxyarylketoximes, and one or more equilibrium modifiers and a selectivity modifier is first contacted with the aqueous acidic solution containing metal, in step 2, separating the solvent extraction composition containing metal-solvent extractant complex from the aqueous acidic solution;

in step 3, contacting the solvent extraction composition containing metal-solvent extractant complex with an aqueous acidic strip solution to effect the stripping of the metal from the water immiscible phase;

in step 4, separating the metal-depleted solvent extraction composition from the loaded aqueous strip solution.

The invention is further illustrated, but not limited, by the following examples.

EXAMPLES

Example 1

Extractant compositions were prepared as described in the following table. 150 ml of each of the extractant compositions was then stirred with 150 ml of an aqueous "extraction" solution containing 1.8 g/l Cu, 1.0 g/l Fe (of which 0.042 g/l was Fe(III)) & pH 2.1. The aqueous and organic were stirred for 3 min to simulate extraction. After 3 min the extractant compositions were separated, and the organic was sampled. The metal loaded extractant was then mixed with 30 ml of an aqueous "strip" solution containing 35.3 g/l Cu and 179 g/l of sulphuric acid for 3 minutes. After separation the extractant compositions were sampled. The samples of the organic phase were then analysed for copper and iron content. The table below shows the results for each extractant composition in terms of Transfer ratio.

|   | Extractant Composition | Cycle | Org. Cu (g/l) | Org. Fe (g/l) | % Cu Strip | Cu/Fe Transfer Ratio | Cu/Fe |
|---|---|---|---|---|---|---|---|
| A | 0.179 M 2-hydroxy-5-nonylsalicylaldoxime + 0.1 M 2,2,4-trimethyl-1,3-pentanediol di-isobutyrate In kerosene | Load Strip | 4.77 2.14 | 0.00063 0.00007 | 55.14 | 4696 | |
| B | 0.00179 M Bis(2,4,4-trimethyl)phosphinic acid In kerosene | Load Strip | 0.001 0.001 | 0.0051 0.00116 | 0.00 | 0 | |
| C | 0.179 M 2-hydroxy-5-nonylsalicylaldoxime + 0.1 M 2,2,4-trimethyl-1,3-pentanediol di-isobutyrate + 0.00179 M Bis(2,4,4-trimethyl)phosphinic acid In kerosene | Load Strip | 4.71 2.08 | 0.069 0.049 | 55.84 | 132 | |
| D | 0.179 M 2-hydroxy-5-nonylacetophenone oxime In kerosene | Load Strip | 4.28 2.27 | 0.0014 0.00042 | 46.96 | 2051 | |
| E | 0.179 M 2-hydroxy-5-nonylacetophenone oxime + 0.00179 M Bis(2,4,4-trimethyl)phosphinic acid In kerosene | Load Strip | 3.82 1.29 | 0.0628 0.0482 | 66.23 | 173 | |

As shown neither the modified aldoxime (A), nor the ketoxime (D) was capable of transferring significant amounts of iron in the presence of copper. The phosphinic acid (B) transferred some iron without copper, however the blend of oxime with phosphinic acid (Examples C and E) transferred significantly more iron than would be expected relative to the individual components. Transfer ratios dropped from over 2000:1 to less than 200:1 without impacting copper transfer.

The increased iron transfer and corresponding lower Cu:Fe transfer ratio was achieved without impact to the stability of the oxime, or other negative physical or metallurgical effects.

Example 2

Extractant compositions were prepared by mixing aliquots of 2-hydroxy-5-nonylsalicylaldoxime (an aldoxime) & 2,2,4-trimethyl-1,3-pentanediol di-isobutyrate (a modifier) with varying masses of Tributyl Phosphite (TBP). In each case 11.76 g (0.179M) of aldoxime, 7.23 g (0.1M) of modifier and 0 g (Blank); 0.118 g (0.00179M) & 1.18 g (0.0179M) of TBP (95% purity) was made up to 0.25 liter with Orfom SX7 (a diluent).

200 ml of the extractant composition was then stirred with 200 ml of an aqueous "extraction" solution containing 3.5 g/l Cu, 3.8 g/l Fe (of which 1.0 g/l was Fe(III)) & pH 2.1 for 30 min to simulate extraction. After 30 min the extractant composition was separated from the aqueous and sampled. The extractant formulation was then stirred for a further 30 minutes with 40 ml of an aqueous "strip" solution containing 35.3 g/l Cu and 179 g/l of sulphuric acid. After separation the extractant composition was sampled. The samples of the organic phase were then analysed for copper and iron content. The table below shows the results for 100:1 and 10:1 molar ratios of aldoxime to potential selectivity modifier.

|   | Cycle | Org. Cu (g/l) | Org. Fe (g/l) | Transfer Ratio |
|---|---|---|---|---|
| 0.179 M 2-hydroxy-5-nonylsalicylaldoxime + 0.1 M 2,2,4-trimethyl-1,3-pentanediol di-isobutyrate (BLANK) | Load Strip | 5.22 2.44 | 0.0022 0.00002 | 1275 |
| +BLANK + 0.0179 M TBP | Load Strip | 4.99 2.55 | 0.0029 0.00036 | 961 |
| +BLANK + 0.00179 M TBP | Load Strip | 5.31 2.51 | 0.00153 0.00012 | 1986 |

As shown TBP is surprisingly not suitable as a selectivity modifier and did not enhance iron transfer relative to the 'BLANK' extractant composition.

Example 3

Extractant compositions were prepared by mixing aliquots of 2-hydroxy-5-nonylsalicylaldoxime (an aldoxime) & 2,2,4-trimethyl-1,3-pentanediol di-isobutyrate (a modifier) with varying masses of Di(2-ethylhexyl) phosphoric acid (DEHPA). In each case 11.76 g (0.179M) of aldoxime, 7.23 g (0.1M) of modifier and 0 g (Blank); 0.149 g (0.00179M) & 1.49 g (0.0179M) of DEHPA (97% purity) was made up to 0.25 liter with Orfom SX7 (a diluent).

200 ml of the extractant composition was then stirred with 200 ml of an aqueous "extraction" solution containing 3.5 g/l Cu, 3.8 g/l Fe (of which 1.0 g/l was Fe(III)) & pH 2.1 for 30 min to simulate extraction. After 30 min the extractant composition was separated and sampled. The extractant composition was then stirred for a further 30 minutes with 40 ml of an aqueous "strip" solution containing 35.3 g/l Cu and 179 g/l of sulphuric acid. After separation the extractant composition was sampled. The samples of the organic phase were then analysed for copper and iron content. The table below shows the results for 100:1 and 10:1 molar ratios of aldoxime to potential selectivity modifier.

|  | Cycle 3 | Org. Cu (g/l) | Org. Fe (g/l) | Transfer Ratio |
| --- | --- | --- | --- | --- |
| 0.179 M 2-hydroxy-5-nonylsalicylaldoxime + 0.1 M 2,2,4-trimethyl-1,3-pentanediol di-isobutyrate (BLANK) | Load Strip | 5.22 2.44 | 0.0022 0.00002 | 1275 |
| +BLANK + 0.0179 M DEHPA | Load Strip | 4.42 2.1 | 0.549 0.386 | 14 |
| +BLANK + 0.00179 M DEHPA | Load Strip | 5.22 2.8 | 0.075 0.059 | 151 |

Although the addition of DEHPA succeeded in reducing the Cu:Fe transfer ratio, the amount of iron remaining in the organic phase following the strip cycle was greater than 70%. On repetition of the experiment it was determined DEHPA loads readily but does not strip easily—using standard strength electrolyte. DEHPA is therefore effectively poisoned by iron and therefore unsuitable as a selectivity modifier.

Example 4

Extractant compositions were prepared by mixing aliquots of 2-hydroxy-5-nonylsalicylaldoxime (an aldoxime) & 2,2,4-trimethyl-1,3-pentanediol di-isobutyrate (a modifier) with varying masses of Acorga SBX-50. SBX-50 is a mixture of which is a mixture of isooctadecyl-phosphoric and di-isooctadecyl-phosphoric acids. In each case 11.76 g (0.179M) of aldoxime, 7.23 g (0.1M) of modifier and 0 g (Blank); 0.199 g (0.00179M) & 1.99 g (0.0179M) of SBX-50 (90% purity) was made up to 0.25 liter with Orfom SX7 (a diluent). 200 ml of the extractant composition was then stirred with 200 ml of an aqueous "extraction" solution containing 3.5 g/l Cu, 3.8 g/l Fe (of which 1.0 g/l was Fe(III)) & pH 2.1 for 30 min to simulate extraction. After 30 min the extractant composition was separated and sampled. The extractant composition was then stirred for a further 30 minutes with 40 ml of an aqueous "strip" solution containing 35.3 g/l Cu and 179 g/l of sulphuric acid. After separation the extractant composition was sampled. The samples of the organic phase were then analysed for copper and iron content. The table below shows the results for 100:1 and 10:1 molar ratios of aldoxime to potential selectivity modifier.

|  | Cycle | Org. Cu (g/l) | Org. Fe (g/l) | Transfer Ratio |
| --- | --- | --- | --- | --- |
| 0.179 M 2-hydroxy-5-nonylsalicylaldoxime + 0.1 M 2,2,4-trimethyl-1,3-pentanediol di-isobutyrate (BLANK) | Load Strip | 5.22 2.44 | 0.0022 0.00002 | 1275 |
| +BLANK + 0.0179 M SBX-50 | Load Strip | 4.9 2.18 | 0.607 0.538 | 39 |
| +BLANK + 0.00179 M SBX-50 | Load Strip | 5.21 2.47 | 0.076 0.0549 | 130 |

Again the example shows that the extractant formulations containing SBX-50 are poisoned by iron. The iron loads readily but does not strip easily. SBX-50 is therefore unsuitable as a selectivity modifier.

Example 5

Extractant compositions were prepared by mixing aliquots of 2-hydroxy-5-nonylsalicylaldoxime (an aldoxime) & 2,2,4-trimethyl-1,3-pentanediol di-isobutyrate (a modifier) with varying masses of tris (2-ethylhexyl)amine (TEHA). In each case 11.76 g (0.179M) of aldoxime, 7.23 g (0.1M) of modifier and 0 g (Blank); 0.16 g (0.00179M) of TEHA was made up to 0.25 liter with Orfom SX7 (a diluent).

200 ml of the extractant composition was then stirred with 200 ml of an aqueous "extraction" solution containing 3.5 g/l Cu, 3.8 g/l Fe (of which 1.0 g/l was Fe(III)) & pH 2.1 for 30 min to simulate extraction. After 30 min the extractant composition was separated and sampled. The extractant composition was then stirred for a further 30 minutes with 40 ml of an aqueous "strip" solution containing 35.3 g/l Cu and 179 g/l of sulphuric acid. After separation the extractant composition was sampled. The samples of the organic phase were then analysed for copper and iron content. The table below shows the results for 100:1 and 10:1 molar ratios of aldoxime to potential selectivity modifier.

|  | Cycle 3 | Org. Cu (g/l) | Org. Fe (g/l) | Transfer Ratio |
| --- | --- | --- | --- | --- |
| Blank | Load | 5.22 | 0.0022 | 1275 |
| +0.00179 M TEHA | Load Strip | 5.12 2.48 | 0.00254 0.00008 | 1073 |

As shown TEHA (a known iron extractant) does not complex iron readily under the test conditions and is therefore unsuitable as a selectivity modifier.

Example 6

Extractant compositions were prepared by mixing aliquots of 2-hydroxy-5-nonylsalicylaldoxime (an aldoxime) & 2,2,4-trimethyl-1,3-pentanediol di-isobutyrate (a modifier) with varying masses of dinonylnaphthalene sulfonic acid (DNNSA)—a known iron transferring agent. In each case 11.76 g (0.179M) of aldoxime, 7.23 g (0.1M) of modifier and 0 g (Blank) & 0.16 g (0.00179M) of DNNSA was made up to 0.25 liter with Orfom SX7 (a diluent).

Accelerated degradation tests were carried out on the extractant compositions. 250 ml of each extractant composition was mixed with an aqueous solution containing 30.0 g/l of copper and 179 g/l of sulphuric acid for 284 hours at 60° C. samples were taken periodically and the rate constants calculated.

|  | K = (hr-1) |
| --- | --- |
| 0.179 M 2-hydroxy-5-nonylsalicylaldoxime + 0.1 M 2,2,4-trimethyl-1,3-pentanediol di-isobutyrate (BLANK) | 0.000651 |
| +BLANK + 0.00179 M DNNSA | 0.012352 |

Although DNNSA is known to extract iron under the test conditions—in formulation with an oxime extractant it is not suitable as a "selectivity modifier". The example demonstrates that the degradation rate of the extractant formulation containing DNNSA was several order of magnituted greater than the Blank. DNNSA would therefore be unsuitable as a selectivity modifier.

Example 7

Extractant compositions were prepared by mixing aliquots of 2-hydroxy-5-nonylsalicylaldoxime (an aldoxime) & 2,2,4-trimethyl-1,3-pentanediol di-isobutyrate (an equilibrium modifier) with varying masses of phosphinic and phosphonic selectivity modifiers. In each case 47.1 g of aldoxime, 28.64 g of modifier and 0.00179M of each potential selectivity modifier was made up to 1.0 liter with Orfom SX7 (a diluent).

100 ml of the extractant composition was then stirred with 300 ml of an aqueous "extraction" solution containing 1.43 g/l Cu, 7.91 g/l Fe & pH 2.0 for 30 min to simulate extraction. After 30 min the extractant composition was separated and sampled. The extractant composition was then stirred for a further 30 minutes with 20 ml of an aqueous "strip" solution containing 35.6 g/l Cu, 3.1 g/l Fe and 179 g/l of sulphuric acid. After separation the extractant composition was sampled. The samples of the organic phase were then analysed for copper and iron content. The table below shows the results for a 100:1 molar ratio of aldoxime to selectivity modifier.

|  | Cycle | Org. Cu (g/l) | Org. Fe (g/l) | Transfer Ratio |
|---|---|---|---|---|
| Aldoxime + EquilibriumModifier | Load | 5.19 | 0.0034 | 726 |
|  | Strip | 3.23 | 0.0007 |  |
| +Aldoxime + Equilibrium Modifier + Bis(2,4,4-trimethyl)phosphinic acid, | Load | 5.04 | 0.096 | 43 |
|  | Strip | 3.18 | 0.053 |  |
| Aldoxime + Equilibrium Modifier + 2-ethylhexylphosphonic acid, mono-2-ethylhexyl ester, | Load | 5.04 | 0.093 | 53 |
|  | Strip | 3.18 | 0.058 |  |

The example demonstrates that both Bis(2,4,4-trimethyl)phosphinic acid and 2-ethylhexylphosphonic acid, mono-2-ethylhexyl ester would be suitable selectivity modifiers.

Example 8

High Ratio of 2-Hydroxy-5-Nonylsalicylaldoxime to Selectivity Modifier

Extractant compositions A, B & C were prepared as described in the following table. 50 ml of each of the extractant compositions was stirred with 150 ml of an aqueous "extraction" solution containing 5.0 g/l Cu, 0.2 g/l Fe (III)), pH 1.74 for 3 min to simulate extraction. After extraction the extractant compositions were separated, and then mixed for a further 3 minutes with 25 ml of an aqueous "strip" solution containing 32.5 g/l Cu and 176 g/l of sulfuric acid. After separation the aqueous phase was discarded and the extraction and strip procedures repeated a further two times. The ratio of extractant composition to aqueous "extraction" solution was 1:2 for the second and third contacts. The ratio of extractant composition to "strip" solution was 2:1 for the second and third contacts. After the third cycle samples of the organic and aqueous phases were taken and copper and iron concentration in each measured. The table below shows the results after the third cycle.

Formulation composition A contained no selectivity modifier and under the test conditions a Cu/Fe transfer ratio of 17040 was obtained. Formulation composition B included the addition of the selectivity modifier bis(2,4,4-trimethylpentyl) phosphinic acid to achieve a molar ratio of a ratio of 2-hydroxy-5-nonylsalicylaldoxime to bis(2,4,4-trimethylpentyl) phosphinic acid of 5000:1. Under the same test conditions as for A, the Cu/Fe Transfer Ratio of B decreased to 6940 from 17040.

Formulation composition C included the addition of 2-ethylhexylphosphonic acid, mono-2-ethylhexyl ester to achieve a molar ratio of 2-hydroxy-5-nonylsalicylaldoxime to 2-ethylhexylphosphonic acid, mono-2-ethylhexyl ester of 5000:1. Under the test conditions as for A, the Cu/Fe transfer ratio of C decreased from to 5135 from 17040.

Example 9

High Ratio of 2-Hydroxy-5-Nonylsalicylaldoxime+2-Hydroxy-5-Nonylacetophenone Oxime to Selectivity Modifier.

Extractant compositions A, B & C were prepared as described in the following table. 50 ml of each of the extractant compositions was stirred with 150 ml of an aqueous "extraction" solution containing 7.0 g/l Cu, 0.2 g/l Fe (III)), pH 1.74 for 3 min to simulate extraction. After extraction the extractant compositions were separated, and then mixed for a further 3 minutes with 25 ml of an aqueous "strip" solution containing 32.5 g/l Cu and 176 g/l of sulfuric acid. After separation the aqueous phase was discarded and the extraction and strip procedures repeated a further two times. The ratio of extractant composition to aqueous "extraction" solution was 1:2 for the second and third contacts. The ratio of extractant composition to "strip" solution was 2:1 for the second and third contacts. After the third cycle samples of the organic and aqueous phases were taken and copper and iron concentration in each measured. The table below shows the results after the third cycle.

|  | Extractant Composition | Cycle | Crg. Cu (g/l) | Org. Fe (g/l) | Cu Strip (%) | Cu/Fe Rejection Ratio | Cu/Fe Transfer Ratio | Cu Transfer (g/l) |
|---|---|---|---|---|---|---|---|---|
| A | 0.365 M 2-hydroxy-5-nonylsalicylaldoxime + 0.268 M 2,2,4-trimethyl-1,3-pentanediol di-isobutyrate | Load | 7.72 | 0.00029 |  | 26621 | 17040 | 4.3 |
|  |  | Strip | 3.46 | 0.00004 | 55.2 |  |  |  |
| B | 0.365 M 2-hydroxy-5-nonylsalicylaldoxime + 0.268 M 2,2,4-trimethyl-1,3-pentanediol di-isobutyrate + 0.000073 M Bis(2,4,4-trimethylpentyl)phosphinic acid | Load | 8.15 | 0.00074 | 57.1 | 11014 | 6940 | 4.7 |
|  |  | Strip | 3.5 | 0.00007 |  |  |  |  |
| C | 0.365 M 2-hydroxy-5-nonylsalicylaldoxime + 0.268 M 2,2,4-trimethyl-1,3-pentanediol di-isobutyrate + 0.000073 M 2-ethylhexylphosphonic acid, mono-2-ethylhexyl ester | Load | 8.78 | 0.00106 | 56.2 | 8283 | 5135 | 4.9 |
|  |  | Strip | 3.85 | 0.0001 |  |  |  |  |

|   | Extractant Composition | Cycle | Crg. Cu (g/l) | Org. Fe (g/l) | Cu Strip (%) | Cu/Fe Rejection Ratio | Cu/Fe Transfer Ratio | Cu Transfer (g/l) |
|---|---|---|---|---|---|---|---|---|
| A | 0.18 M 2-hydroxy-5-nonylsalicylaldoxime + 0.17 M 2-hydroxy-5-nonylacetophenone oxime | Load Strip | 8.85 3.93 | 0.00053 0.00031 | 55.6 | 16698 | 22364 | 4.9 |
| B | 0.18 M 2-hydroxy-5-nonylsalicylaldoxime + 0.17 M 2-hydroxy-5-nonylacetophenone oxime + 0.00035 M Bis(2,4,4-trimethylpentyl) phosphinic acid | Load Strip | 8.92 3.87 | 0.0039 0.00069 | 56.6 | 2287 | 1573 | 5.1 |
| C | 0.18 M 2-hydroxy-5-nonylsalicylaldoxime + 0.17 M 2-hydroxy-5-nonylacetophenone oxime + 0.00035 M 2-ethylhexylphosphonic acid, mono-2-ethylhexyl ester | Load Strip | 8.87 3.79 | 0.0044 0.00037 | 57.3 | 2016 | 1261 | 5.1 |

Formulation composition A contained no selectivity modifier and under the test conditions a Cu/Fe transfer ratio of 22364 was obtained. Formulation composition B included the addition of the selectivity modifier bis(2,4,4-trimethylpentyl) phosphinic acid to achieve a molar ratio of a ratio of 2-hydroxy-5-nonylsalicylaldoxime/2-hydroxy-5-nonylacetophenone oxime to bis(2,4,4-trimethylpentyl)phosphinic acid of 1000:1. Under the same test conditions as for A, the Cu/Fe Transfer Ratio of B decreased to 1573 from 22364.

Formulation composition C included the addition of 2-ethylhexylphosphonic acid, mono-2-ethylhexyl ester to achieve a molar ratio of 2-hydroxy-5-nonylsalicylaldoxime/2-hydroxy-5-nonylacetophenone oxime to 2-ethylhexylphosphonic acid, mono-2-ethylhexyl ester of 1000:1. Under the test conditions as for A, the Cu/Fe transfer ratio of C decreased to 1261 from 22364.

Example 10

10 Low Ratio of 2-Hydroxy-5-Nonylsalicylaldoxime to Selectivity Modifier

Extractant compositions D, E, F, G & H were prepared as described in the following table. 50 ml of each of the extractant compositions was stirred with 150 ml of an aqueous "extraction" solution containing 4.6 g/l Cu, 0.8 g/l Fe (III)), pH 2.0 for 3 min to simulate extraction. After extraction the extractant compositions were separated, and then mixed for a further 3 minutes with 25 ml of an aqueous "strip" solution containing 35.0 g/l Cu and 181 g/l of sulfuric acid. After separation the aqueous phase was discarded and the extraction and strip procedures repeated a further two times. The ratio of extractant composition to aqueous "extraction" solution was 1:2 for the second and third contacts. The ratio of extractant composition to "strip" solution was 2:1 for the second and third contacts. After the third cycle samples of the organic and aqueous phases were taken and copper and iron concentration in each measured. The table below shows the results after the third cycle.

|   | Extractant Composition | Cycle | Crg. Cu (g/l) | Org. Fe (g/l) | Cu Strip (%) | Cu/Fe Rejection Ratio | Cu/Fe Transfer Ratio | Cu Transfer (g/l) |
|---|---|---|---|---|---|---|---|---|
| D | 0.456 M 2-hydroxy-5-nonylsalicylaldoxime + 0.334 M 2,2,4-trimethyl-1,3-pentanediol di-isobutyrate | Load Strip | 11.05 4.49 | 0.0005 0.0001 | 59.4 | 22100 | 16400 | 6.6 |
| E | 0.456 M 2-hydroxy-5-nonylsalicylaldoxime + 0.334 M 2,2,4-trimethyl-1,3-pentanediol di-isobutyrate + 0.228 M Bis(2,4,4-trimethylpentyl)phosphinic acid | Load Strip | 7.9 2 | 0.71 0.52 | 74.7 | 11 | 32 | 5.9 |
| F | 0.456 M 2-hydroxy-5-nonylsalicylaldoxime + 0.334 M 2,2,4-trimethyl-1,3-pentanediol di-isobutyrate + 0.091 M Bis(2,4,4-trimethylpentyl) phosphinic acid | Load Strip | 9.3 3.28 | 0.37 0.19 | 64.7 | 25 | 34 | 6.0 |
| G | 0.456 M 2-hydroxy-5-nonylsalicylaldoxime + 0.334 M 2,2,4-trimethyl-1,3-pentanediol di-isobutyrate + 0.228 M 2-ethylhexylphosphonic acid, mono-2-ethylhexyl ester | Load Strip | 8.3 2.4 | 2.85 2.54 | 71.1 | 3 | 19 | 5.9 |
| H | 0.456 M 2-hydroxy-5-nonylsalicylaldoxime + 0.334 M 2,2,4-trimethyl-1,3-pentanediol di-isobutyrate + 0.091 M 2-ethylhexylphosphonic acid, mono-2-ethylhexyl ester | Load Strip | 9.88 3.59 | 1.37 1.05 | 63.7 | 7 | 20 | 6.3 |

Formulation composition D contained no selectivity modifier and under the test conditions a Cu/Fe transfer ratio of 16400 was obtained. Formulation E included the addition of the selectivity modifier bis(2,4,4-trimethylpentyl)phosphinic acid to achieve a molar ratio of 2-hydroxy-5-nonylsalicylaldoxime to bis(2,4,4-trimethylpentyl)phosphinic acid of 2:1. Under the same test conditions as for D, the Cu/Fe Transfer Ratio of E decreased to 32 from 16400.

Formulation F included the addition of the selectivity modifier bis(2,4,4-trimethylpentyl)phosphinic acid to achieve a molar ratio of 2-hydroxy-5-nonylsalicylaldoxime to bis(2,4,4-trimethylpentyl)phosphinic acid of 5:1. Under the same test conditions as for D, the Cu/Fe Transfer Ratio of F decreased to 34 from 16400.

Formulation G included the addition of the selectivity modifier 2-ethylhexylphosphonic acid, mono 2-ethylhexyl ester to achieve a molar ratio of 2-hydroxy-5-nonylsalicylaldoxime to 2-ethylhexylphosphonic acid, mono 2-ethylhexyl ester of 2:1. Under the same test conditions as for D, the Cu/Fe Transfer Ratio of G decreased to 19 from 16400.

Formulation H included the addition of the selectivity modifier 2-ethylhexylphosphonic acid, mono 2-ethylhexyl ester to achieve a molar ratio of 2-hydroxy-5-nonylsalicylaldoxime to 2-ethylhexylphosphonic acid, mono 2-ethylhexyl ester of 5:1. Under the same test conditions as for D, the Cu/Fe Transfer Ratio of H decreased to 20 from 16400.

The invention claimed is:

1. A solvent extraction composition comprising: having a copper:iron transfer ratio between 34 and 1700
   a) one or more orthohydroxyarylaldoximes and/or one or more orthohydroxyarylketoximes;
   b) one or more selectivity modifiers chosen from one or more phosphinic acid and/or phosphonic acid, and salts and esters thereof;
   c) one or more equilibrium modifiers selected from alkylphenols, alcohols, esters, ethers and polyethers, carbonates, ketones, nitriles, amides, carbamates, sulphoxides, and salts of amines and quaternary ammonium compounds; and
   d) a water immiscible organic solvent,
   wherein the selectivity modifier is present in a molar ratio of the o-hydroxyoxime from 0.001 to 0.05.

2. A solvent extraction composition according to claim 1, wherein the phosphinic acid, or salts or esters thereof, is chosen from a compound according to formula $R_4R_5P(O)OR_6$ where each of $R_4$ and $R_5$ is independently chosen from H, $C_1$-$C_{20}$ alkyl, aryl or arylalkyl group, and $R_6$ is chosen from H, a metal cation or $N(R_7)_4$ where $R_7$ is chosen from H, $C_1$-$C_{20}$ alkyl, aryl or arylalkyl group, and wherein the phosphonic acid, or salts or esters thereof, is chosen from a compound according to formula $R_8R_9OP(O)OR_{10}$ where each of $R_8$ and $R_9$ is chosen from H, $C_1$-$C_{20}$ alkyl, aryl or arylalkyl group, and $R_{10}$ is H, a metal cation, or $N(R_7)_4$ where $R_7$ is H, $C_1$-$C_{20}$ alkyl, aryl or arylalkyl group.

3. A solvent extraction composition according to claim 1, wherein the selectivity modifier is chosen from bis(2,4,4-trimethylpentyl)phosphinic acid, bis(2-ethylhexyl)phosphinic acid, bis(2-ethylhexyl)phosphonic acid, phenylphosphonic acid or their salts and 2-ethylhexylphosphonic acid, mono-2-ethylhexyl ester.

4. A solvent extraction composition according to claim 3 wherein the selectivity modifier is bis(2,4,4-trimethylpentyl) phosphinic acid or 2-ethylhexylphosphonic acid, mono-2-ethylhexyl ester.

5. A solvent extraction composition according to claim 1, wherein the selectivity modifier is present in a molar ratio of the o-hydroxyoxime from about 0.001 to 0.01.

6. A solvent extraction composition according to claim 1, wherein the orthohydroxyarylketoxime is a 5-($C_8$-$C_{14}$ alkyl)-2-hydroxyacetophenone oxime, and the orthohydroxyarylaldoxime is a 5-($C_8$-$C_{14}$ alkyl)-2-hydroxybenzaldoxime.

7. A solvent extraction composition according to claim 1, wherein said one or more equilibrium modifiers is chosen from: 2,2,4-trimethyl-1,3-pentanediol mono-isobutyrate; 2,2,4-trimethyl-1,3-pentanediol mono-benzoate; 2,2,4-trimethyl-1,3-pentanediol di-isobutyrate; 2,2,4-trimethyl-1,3-pentanediol di-benzoate; di-butyl adipate; di-pentyl adipate; di-hexyl adipate; isobutyl heptyl ketone; nonanone; 2,6,8-trimethyl-4-nonanone; diundecyl ketone; 5,8-diethyldodecane-6,7-dione; tridecanol; tetraethyleneglycol di-2-ethylhexanoate and nonyl phenol.

8. A solvent extraction composition according to claim 7, wherein the orthohydroxyarylketoxime is 2-hydroxy-5-nonylacetophenone oxime, and the orthohydroxyarylaldoxime is 2-hydroxy-5-nonylsalicylaldoxime and equilibrium modifier is 2,2,4-trimethyl-1,3-pentanediol di-isobutyrate.

9. A solvent extraction composition according to claim 1, wherein the ratio of orthohydroxyarylaldoximes and/or one or more orthohydroxyarylketoximes to equilibrium modifier is from 5000:1 to about 2:1.

* * * * *